UNITED STATES PATENT OFFICE.

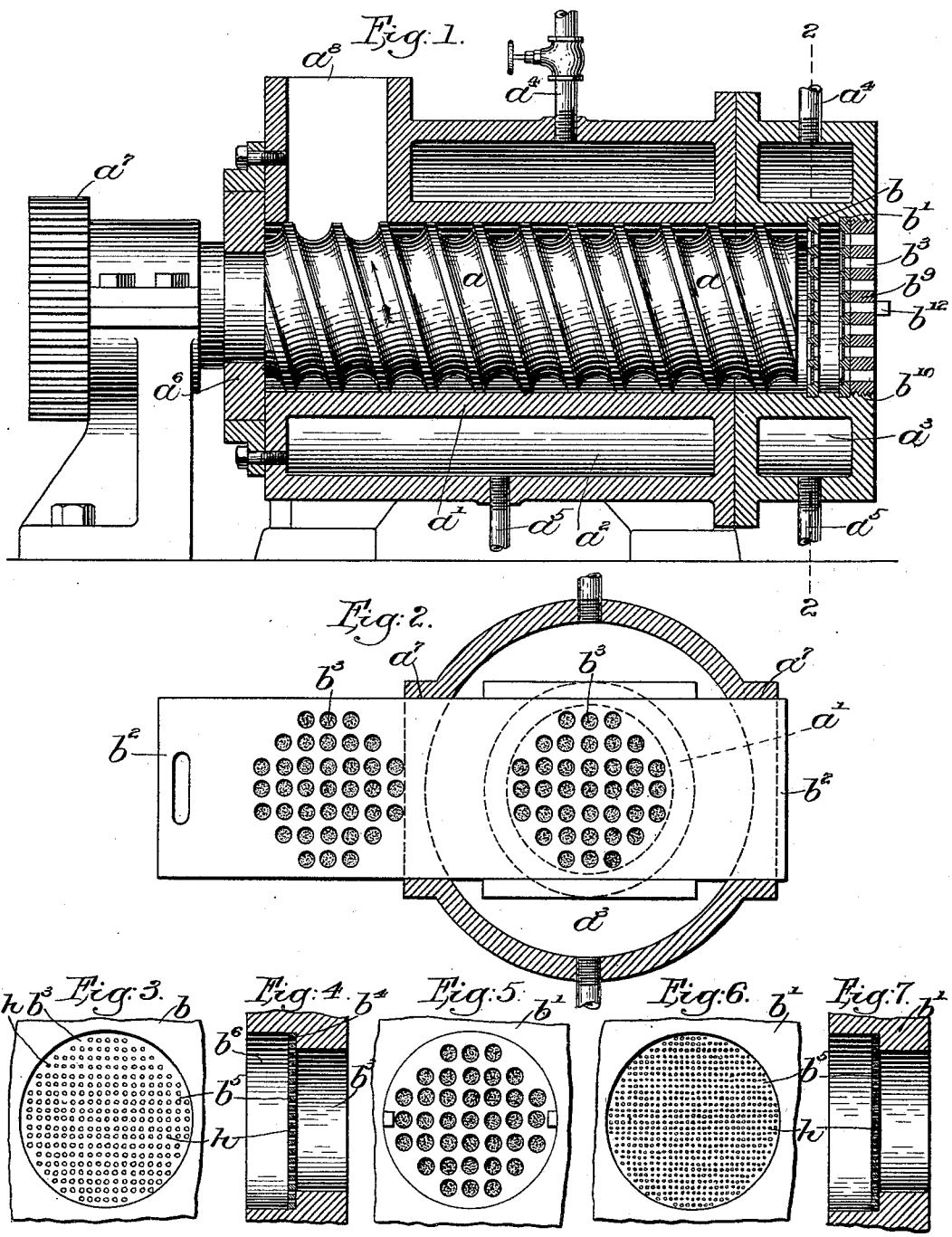

ROBERT COWEN, OF CAMBRIDGE, MASSACHUSETTS.

PROCESS OF CLEANING RUBBER.

SPECIFICATION forming part of Letters Patent No. 642,814, dated February 6, 1900.

Application filed September 22, 1899. Serial No. 731,262. (No specimens.)

*To all whom it may concern:*

Be it known that I, ROBERT COWEN, a citizen of the United States, residing at Cambridge, county of Middlesex, State of Massachusetts, have invented an Improvement in Processes of Cleaning Rubber, of which the following description, in connection with the accompanying drawings, is a specification, like letters on the drawings representing like parts.

As is well known, rubber, whether it be the raw material or shoddy, &c., which it is desired to work over again is usually more or less filled with foreign substances, such as bark, dirt, pieces of wood, stones, &c., in the case of raw rubber, and nails, buckles, straps, cloth, and various other foreign substances in the case of shoddy, &c. Heretofore attempts have been made to cleanse the rubber of these foreign materials in various ways, the details of which it is unnecessary to set forth herein further than to say that sometimes the rubber mass has been ground and dried and subjected to the action of a blower to partly separate the ground mixture by gravity and metallic parts have been removed by being passed in front of magnets, while the fibrous foreign matter has been eliminated by the action of sulfuric acid thereon. All of these methods have, however, more or less objectionable features and are tedious, expensive, and unsatisfactory in their results. Accordingly I invented the herein-described method, which attains the desired object quickly and thoroughly in a simple manner and at slight expense.

Stated in general terms, my invention consists in reducing the rubber (whether in the form of raw or shoddy rubber or otherwise) to a plastic or partially fluid condition and then straining it, thereby separating the foreign substances—such as nails, strings, bits of leather, bark, &c.—mechanically without in any manner deteriorating or damaging the rubber.

My invention will be more fully understood from the following detailed description thereof, reference being had to the accompanying drawings, wherein I have illustrated one form of machine for carrying out my method.

In the drawings, Figure 1 is a central vertical longitudinal section of an apparatus for carrying out my invention. Fig. 2 is a transverse section taken on the line 2 2, Fig. 1. Figs. 3 and 4 are enlarged views, in front elevation and cross-section, of a fragment of the strainer-plate, showing one of the strainer-disks in place. Fig. 5 is a rear elevation of the outer strainer. Figs. 6 and 7 are views similar to Figs. 3 and 4, showing one of the strainer-disks of the outer strainer considerably enlarged.

In carrying out my invention I make the rubber which is to be strained plastic or sufficiently fluid to flow under pressure, and for this purpose I preferably employ heat, inasmuch as this is the most convenient and readily used means for accomplishing my purpose.

Referring to Fig. 1, it will be seen that I have shown a machine having some of the general characteristics of an ordinary tube-machine, the machine shown having a spirally-fluted conveyer $a$ within a jacket $a'$, said jacket being provided with internal chambers $a^2$ $a^3$ for the free circulation of steam or hot water entering at the pipes $a^4$ and passing out through pipes $a^5$, said conveyer being journaled at its rear end in the box $a^6$ and provided with any suitable driving mechanism, a gear-wheel $a^7$ being herein shown for convenience.

The rubber is fed into the machine through a hopper $a^8$, the rubber being supplied in chunks or masses in any form in which the rubber or shoddy may reach this point in its manufacture in passing through the mill, and as it is caught by the rotating conveyer $a$, turning in the direction of the arrow, Fig. 1, it is forced forward under considerable pressure, coming into contact with the heated walls of the chamber or surrounding jacket, so that by the time it reaches the farther end of the machine it is plastic like dough, just enough not to be inconveniently sticky.

At the forward end of the machine I provide one of more strainers $b$ $b'$.

Referring to the more detailed figures of the drawings, it will be seen that I provide a plate (shown in Fig. 2 as an oblong plate $b^2$ (having a plurality of sets of holes $b^3$, one of the holes being shown in enlarged detail in Fig. 4, where it will be seen that it has an annular shoulder $b^4$. On this shoulder is supported a strainer-disk $b^5$, which is preferably made from rigid steel bored transversely with a multitude of small strainer-holes $h$, placed as closely together and in such arrangement as may be desired for the purposes in view.

One reason I employ the form of apparatus just described is because in order to force the rubber through the fine apertures $h$ enormous pressure must be exerted and it is mechanically impracticable to make a properly-apertured diaphragm or strainer of a large size capable of withstanding the pressure. Therefore I provide a plate $b^2$, of sufficient thickness to withstand the pressure of the main body of the rubber being forced along by the conveyer, and in this plate I provide small holes having shoulders which give firm support to small and thin diaphragms which constitute the active strainers or strainer-surfaces.

The circular or disk-like form employed gives the greatest strength, and I locate the ledges $b^4$ at a considerable depth within the plates in order to provide pockets $b^6$ on the inner sides of the strainer-disks, in which the foreign matter may accumulate as it is strained out from the mass of rubber being forced through the strainer.

Preferably a series of strainers are provided for the best work, each successive strainer having finer meshes than the preceding one, two of these being herein shown as sufficient for purposes of illustration, these being illustrated in approximately their actual size in Figs. 3 and 6, the former showing the coarse strainer and the latter showing the fine strainer.

The plate $b$ is herein shown as mounted to slide transversely in ways $a^7$, provided at the opposite sides of the machine, so that as one set of pockets $b^6$ gets filled with detritus and waste the strainer-plate can simply be shoved endwise to the right, as shown in Fig. 2, thereby carrying the choked and filled strainers out of the machine and replacing them with the set of clean strainers at the other end of the plate. Thus the flow of rubber may be practically uninterrupted, and meanwhile the foreign matter accumulated by the first set of strainers may be removed and the strainers cleaned, broken and damaged ones replaced, &c. Then when the second set of strainers has become choked with foreign matter the plate is moved to the left, bringing again the renewed and clean first set of strainers into active operation and carrying out the second set to be cleaned. The cleaning is effected by simply pushing the strainer-disks out from their recesses to the left, Figs. 4 and 7, thereby removing the accumulations from the pockets, and then the disks themselves may be cleaned in any convenient manner. As the plate $b^2$ is slid longitudinally one way or the other the body of rubber within the cylinder of the machine is sheared off by the edge of the cylinder, so that simply such portions of the rubber and accumulations as are contained in the pockets of the strainer are carried out by the plate.

The plate $b'$ is herein shown as removable endwise of the machine, being held in by a perforated back piece or block $b^9$, shown as screw-threaded at $b^{10}$, although it may be held in by any other means, lugs $b^{12}$ being provided thereon to receive a bar or other means for removing it from the machine.

In the case of shoddy containing considerable fibrous material I first macerate the shoddy and soak it in a solution of sulfuric acid to eat away the threads and finer portions of organic material, and then I feed the mass to the machine and force it under pressure and in a plastic condition, as already explained, through the strainer.

I regard it as broadly new to clarify rubber by forcing it in a plastic condition, as described, through mechanical strainers, and accordingly I do not intend to limit my invention to any details otherwise than as expressed in the claims, and while I have confined my description for convenience to "rubber" I wish it understood that I do not by this term mean to limit my invention to "rubber," technically so called, but intend to include thereby any similar or analogous substance requiring substantially similar cleaning.

Having fully described my invention, what I claim, and desire to secure by Letters Patent, is—

1. The herein-described process of cleaning rubber which consists of reducing the rubber to a plastic condition, then straining it under pressure.

2. The herein-described process of cleaning rubber of foreign materials contained therein which consists in heating the rubber to reduce it to a plastic condition and then straining it under pressure.

3. The herein-described process of cleaning rubber of foreign materials contained therein which consists in macerating the mixture, then heating it to reduce the rubber to a plastic condition and straining it under pressure.

In testimony whereof I have signed my name to this specification in the presence of two subscribing witnesses.

ROBERT COWEN.

Witnesses:
GEO. H. MAXWELL,
FREDERICK L. EMERY.